(No Model.)
C. W. SELVIDGE.
MACHINE FOR STRETCHING WIRE OR OTHER PURPOSES.
No. 606,092. Patented June 21, 1898.
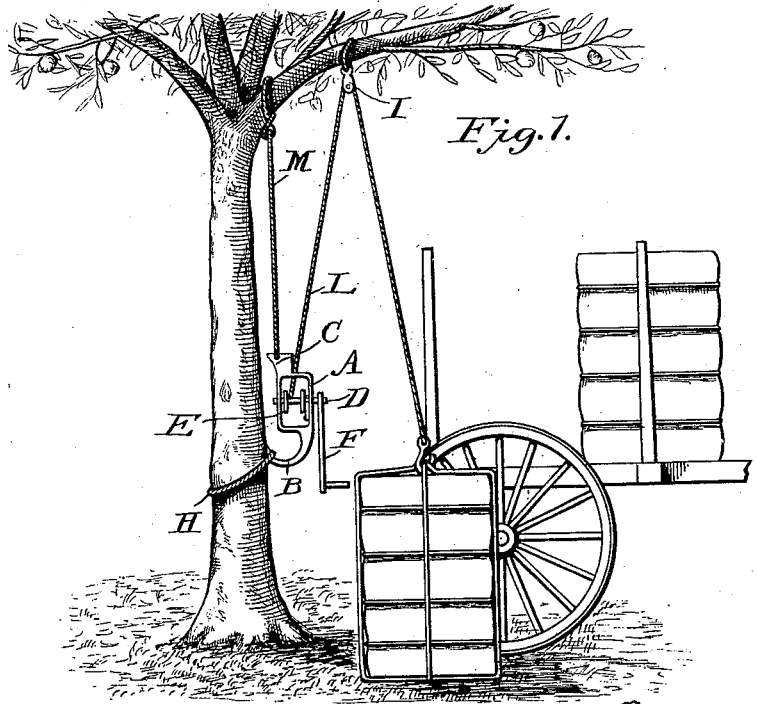
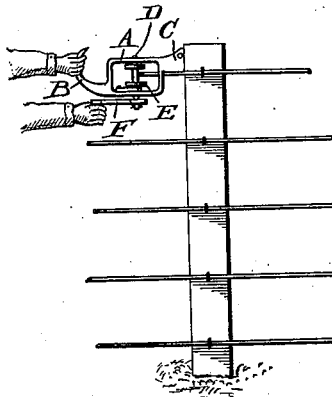
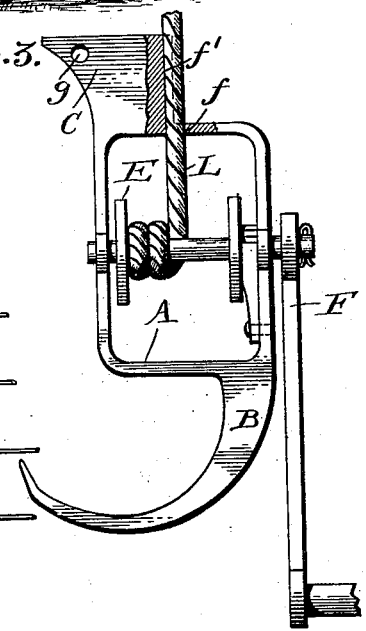
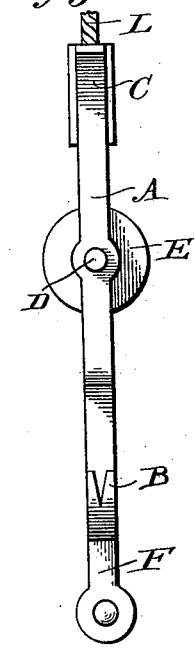
Witnesses.
Edwin G. McKee
Philip C. Miasi
Inventor.
C. W. Selvidge
by E. W. Anderson
his Attorney.

UNITED STATES PATENT OFFICE.

CHARLES W. SELVIDGE, OF MEXIA, TEXAS.

MACHINE FOR STRETCHING WIRE OR OTHER PURPOSES.

SPECIFICATION forming part of Letters Patent No. 606,092, dated June 21, 1898.

Application filed October 20, 1897. Serial No. 655,829. (No model.)

*To all whom it may concern:*

Be it known that I, CHARLES W. SELVIDGE, a citizen of the United States, and a resident of Mexia, in the county of Limestone and State of Texas, have invented certain new and useful Improvements in Machines for Stretching Wire or other Purposes; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view illustrating the use of my invention for loading cotton bales, &c. Fig. 2 is a side elevation showing the use of the invention as a wire-stretcher. Fig. 3 is a side view of the device which embodies the invention, and Fig. 4 is an edge view of the same.

This invention is designed to provide a device for use in loading timber, bales of cotton, beef, and other heavy objects and also for use as a wire-stretcher; and it consists in the novel construction and combination of parts, all as hereinafter described, and pointed out in the appended claim.

The device more particularly consists in a frame having an open rectangular central portion A, an extended curved and slotted claw portion B, which projects from one corner of the central portion, in the plane thereof, and a plane vertical and lateral extension C, which projects from its opposite corner. Journaled transversely in the open central portion A is a shaft D, having a spool or drum E and provided with an operating-crank F. Through the upper arm of the portion A is an opening $f$, and the adjacent vertical edge of the extension C is grooved out, as indicated at $f'$. In the point of the extension C is a small hole $g$.

The manner of loading heavy objects by means of this device is illustrated in Fig. 1. A rope H is made fast around a tree, post, or other convenient fixed object, and the claw B is hooked thereto. A pulley I is made fast to a limb of the tree or to other suitable support above. The lifting-rope L is fastened at one end to the drum or spool E and from thence through the pulley I and to the object to be raised. One hand is placed on the extension C to steady the device, and the crank F is turned with the other hand. The aperture $f$ and groove $f'$ form a guide for the rope L, whereby it is directed squarely onto the winding-spool. A small rope M is usually placed through the hole $g$ for the purpose of holding the device suspended when not in use.

When using the device as a wire-stretcher, the square end of the extension C is placed against the post to which the wire is to be stapled, and the hook or claw B is held with one hand. The wire is made fast to the spool and by the operation of the crank with the other hand can be stretched several inches past the post and stapled to the same post to which the stretching device is applied.

The lug extension C of the frame is of great utility when using the device as a wire-stretcher, for the reason that it permits the wire to be stretched entirely by the post. It is not practical to carry and wind the wire upon the reel or spool E, for the reason that only comparatively short lengths could be wound thereon and the wire would have to be cut and for the further reason that the wire is apt to kink and difficulty would be experienced in unwinding it and in drawing it in and out through the hole $f$, especially with barbed wire. It is therefore the practice to attach a suitable wire-grip to the rope L. It will be readily seen that if the frame were not provided with this extension, but the end of the frame were placed directly against the post, it would be difficult to pull the wire and grip sufficiently by the post to permit the wire to be stapled thereto. In fact this cannot be done unless the wire is caught by the grip at exactly the right place; otherwise the wire would become taut before the grip was pulled back to the post, or else the grip would have to be pulled clear by the post (which could not be done on account of its coming in contact with the frame) before the wire would be taut. By providing this extension, however, the grip may be pulled by the post to the extent of the length of the extension, and the difficulties above mentioned are avoided. The extension is also of value when the device is used in lifting heavy objects, as shown in Fig. 1, since it may be grasped with the left hand and the frame held steady while the crank is turned with the right hand.

Having thus described my invention, what I claim as new, and desire to secure by Letters Patent, is—

The herein-described device for use as a wire-stretcher, and for other purposes, consisting of the centrally-open frame, having a claw extension at one corner portion, and a lug extension at the opposite corner portion, said extension having a broadened square end adapted to take a bearing against a fence-post, and having its lateral edge longitudinally grooved, said frame having a hole through its end portions in line with said groove, substantially as specified.

In testimony whereof I affix my signature in presence of two witnesses.

CHAS. W. SELVIDGE.

Witnesses:
 TRACY MCKENZIE,
 K. PHILPOTT.